US012780660B2

(12) United States Patent
Wang et al.

(10) Patent No.: US 12,780,660 B2
(45) Date of Patent: Nov. 3, 2026

(54) PURIFICATION APPARATUS AND PURIFICATION METHOD FOR NON-METAL SEMICONDUCTOR MATERIAL

(71) Applicant: THE 13TH RESEARCH INSTITUTE OF CHINA ELECTRONICS TECHNOLOGY GROUP CORPORATION, Shijiazhuang (CN)

(72) Inventors: Shujie Wang, Shijiazhuang (CN); Niefeng Sun, Shijiazhuang (CN); Huisheng Liu, Shijiazhuang (CN); Tongnian Sun, Shijiazhuang (CN); Senfeng Xu, Shijiazhuang (CN); Yanlei Shi, Shijiazhuang (CN); Huimin Shao, Shijiazhuang (CN); Lijie Fu, Shijiazhuang (CN); Jian Jiang, Shijiazhuang (CN); Yang Wang, Shijiazhuang (CN); Xiaolan Li, Shijiazhuang (CN)

(73) Assignee: The 13th Research Institute of China Electronics Technology Group Corporation, Shijiazhuang (CN)

( * ) Notice: Subject to any disclaimer, the term of this patent is extended or adjusted under 35 U.S.C. 154(b) by 833 days.

(21) Appl. No.: 18/291,104

(22) PCT Filed: Jul. 5, 2021

(86) PCT No.: PCT/CN2021/104410

§ 371 (c)(1),
(2) Date: Jan. 22, 2024

(87) PCT Pub. No.: WO2022/110811

PCT Pub. Date: Jun. 2, 2022

(65) Prior Publication Data

US 2024/0228286 A1 Jul. 11, 2024

(30) Foreign Application Priority Data

Nov. 24, 2020 (CN) ......................... 202011325625.7
Nov. 24, 2020 (CN) ......................... 202011327308.9

(51) Int. Cl.
*C01B 25/04* (2006.01)

(52) U.S. Cl.
CPC ...... *C01B 25/04* (2013.01); *C01B 2210/0025* (2013.01); *C01B 2210/0042* (2013.01)

(58) Field of Classification Search
CPC ..... C01B 33/021; C01B 33/037; C01B 17/02; C01B 2210/0025; C01B 2210/0042;
(Continued)

(56) References Cited

U.S. PATENT DOCUMENTS 2,848,524 A * 8/1958 Mangin .................. F27D 11/08 373/78
2,975,036 A * 3/1961 Taylor ..................... C30B 15/32 117/936
(Continued)

FOREIGN PATENT DOCUMENTS

CN 101054168 C 6/2009
CN 104404623 A 3/2015
(Continued)

OTHER PUBLICATIONS

International Preliminary Report of Patentability mailed May 30, 2023 in PCT/CN2021/104410.
(Continued)

*Primary Examiner* — Chris Q Liu
(74) *Attorney, Agent, or Firm* — AP3 Law Firm PLLC

(57) ABSTRACT

A purification apparatus and purification method of a non-metallic semiconductor material relate to the field of preparation of high-purity materials, and are especially applicable to preparation of high-purity non-metal materials, in par-
(Continued)

ticular to an apparatus and method for purifying a non-metallic semiconductor material by means of a metal melt. The apparatus includes a furnace body, a pressure balance valve, a crucible disposed in the middle of the lower part of the furnace body, a heating and supporting structure for the crucible, a liftable injection mechanism disposed right above the crucible, and a liftable and rotatable recovery mechanism disposed next to the liftable injection mechanism. The method is completed based on the purification apparatus, and includes: injecting the gasified non-metal material into the metal melt under a high pressure environment; reducing the ambient pressure, and collecting the bubbles volatilized from the metal melt to obtain the purified non-metal material.

10 Claims, 2 Drawing Sheets

(58) Field of Classification Search
CPC ....... C01B 25/04; C01B 25/047; C01B 33/02; C01B 33/025; C01B 33/027; C01B 33/039
USPC .......................................................... 219/420
See application file for complete search history.

(56) References Cited

U.S. PATENT DOCUMENTS 2,976,339 A * 3/1961 Bussard .................. F27D 11/06 373/68
3,953,281 A * 4/1976 Pantusco ................. C30B 15/30 117/911
4,027,722 A * 6/1977 Hunt ..................... B22D 11/113 164/474
4,483,746 A * 11/1984 Rosenhouse ............. B01D 3/10 203/99
5,288,366 A * 2/1994 Holder .................... C30B 15/02 117/214
5,290,395 A * 3/1994 Matsumoto ............. C30B 15/12 117/17
5,373,529 A * 12/1994 Zanner .................... F27B 14/06 373/56
7,553,468 B2 * 6/2009 Honda .................. C01B 33/027 427/255.18
8,257,496 B1 * 9/2012 Bender ................... C30B 29/06 117/214
8,329,133 B2 * 12/2012 Schmid ................... C30B 29/06 423/348
9,352,970 B2 * 5/2016 Moon ................... C01B 33/039
2013/0239616 A1 * 9/2013 Meyer ...................... F27B 14/20 65/162
2013/0239620 A1 * 9/2013 Ferry .................... C30B 11/003 65/355
2013/0239621 A1 * 9/2013 Ferry ........................ F27D 9/00 65/355
2013/0252011 A1 * 9/2013 Deshpande ............. F27B 14/08 65/355
2014/0047952 A1 * 2/2014 Zeng ......................... C22B 9/10 266/233
2020/0038947 A1 * 2/2020 Chen ...................... B22D 45/00
2024/0209545 A1 * 6/2024 Wang ...................... C30B 15/00
2024/0209546 A1 * 6/2024 Wang ...................... C30B 33/02
2024/0228286 A1 * 7/2024 Wang ...................... C01B 25/04
2024/0229291 A1 * 7/2024 Wang ...................... C30B 15/02

FOREIGN PATENT DOCUMENTS

| | | | |
|---|---|---|---|
| CN | 213505992 | | 6/2021 |
| CN | 112408345 | A | 6/2022 |
| CN | 112429708 | A | 6/2022 |
| DE | 234410 | A1 | 4/1986 |
| GB | 941977 | A | 11/1963 |

OTHER PUBLICATIONS

International Search Report and Written Opinion mailed Oct. 11, 2021 in PCT/CN2021/104410.

* cited by examiner

PURIFICATION APPARATUS AND PURIFICATION METHOD FOR NON-METAL SEMICONDUCTOR MATERIAL

CROSS-REFERENCE

This application claims the priority of PCT Application Publication No. WO/2022/110811, filed on Jul. 5, 2021, which claims priority to Chinese Patent Application No. 202011325625.7 and Chinese Patent Application No. 202011327308.9, both filed on Nov. 24, 2020, the entirety of all priority applications is hereby incorporated by reference.

FIELD OF THE INVENTION

The present invention relates to the field of preparation of high-purity materials, and is particularly applicable to the preparation of high-purity non-metal materials, in particular to an apparatus and method for purifying a volatile non-metallic semiconductor material by means of a metal melt.

BACKGROUND OF THE INVENTION

Phosphorus, sulfur, arsenic, etc. are important semiconductor raw materials, which can prepare indium phosphide, gallium phosphide, gallium arsenide, molybdenum disulfide and other semiconductor materials, and play an important role in the national economy. The manufacture of semiconductor materials requires high purity of semiconductor raw materials, generally required to reach 99.999% or more.

The semiconductor raw materials generally contain Fe, Ca, Co, Mg, Cr, Cd, Mn, Ni, Cu, Pb, Zn, Al and other impurity elements.

Taking phosphorus as an example, in the field of phosphorus purification, the traditional industrial preparation methods include sublimation, chlorination or hydrolysis of crude phosphorus, rectification, purification, reduction and other complex processes. Due to complex apparatuses, only a few countries in the world have mastered the purification technology of high-purity phosphorus.

In addition, phosphorus, sulfur and arsenic elements are similar in property, and in the single element required to be purified, other elements will appear in the form of impurities, such as sulfur and arsenic in phosphorus, phosphorus and arsenic in sulfur, and phosphorus and sulfur in arsenic. In traditional methods, impurities of similar properties are difficult to remove.

SUMMARY OF THE INVENTION

The present invention is proposed to solve the above problems.

In order to achieve the inventive objective, the present invention adopts the following technical solution: a purification apparatus of a non-metallic semiconductor material, comprising a sealed furnace body, and a pressure balance valve disposed on the side of the furnace body: the purification apparatus further comprises a crucible disposed in the middle of the lower part of the furnace body, a heating and supporting structure for the crucible, a liftable injection mechanism disposed right above the crucible, and a liftable and rotatable recovery mechanism disposed next to the liftable injection mechanism.

The liftable injection mechanism comprises a source furnace, and a source furnace lifting rod connected to the source furnace: the source furnace comprises a loader, a source furnace heating wire disposed surrounding the loader, and an injection tube connected to the loader from below; and the source furnace lifting rod extends to the outside of the furnace body, and lifts and rotates the source furnace through a driving mechanism.

Based on the above apparatus, the present invention also proposes a purification method of a non-metallic semiconductor material, the purification method comprising the following steps:

- step A, putting a metal in a crucible in the furnace body, and placing a non-metal material substance to be purified in a loader; and vacuuming the furnace body to $10^{-5}$ Pa
- step B, filling the furnace body with an inert gas, so that the pressure of the furnace body is higher than a design pressure;
- step C, heating the metal to a design temperature, and melting the metal to form a metal melt;
- step D, lowering the source furnace and inserting an injection tube into the metal melt; step E, raising the recovery mechanism to the top of the furnace body: heating the non-metal material substance to be purified until it is gasified: injecting the gasified non-metal material into the metal melt until the non-metal material substance to be purified in the loader is completely gasified;
- step F, raising the source furnace; and stopping heating the metal;
- step G, placing the recovery mechanism above the crucible and reducing the pressure of the furnace body; and step H, collecting volatilized bubbles while continuously cooling the recovery mechanism until the bubbles disappear.

Further, the design temperature is T+m, T is the melting point of the binary compound formed by the metal and the non-metal material to be purified, and m has a value range of 10 to 200K.

The design pressure is the saturated vapor pressure at which the metal and the non metal form an 1% melt system at the design temperature.

In step G, the pressure of the furnace body is reduced to the saturated vapor pressure at which the metal and the non metal form a Q % melt system; and $Q<L$.

Further, the substance synthesized from the non-metal material and the metal is a semiconductor material.

Description of Principle.

Under a certain pressure, the gasified non-metal material is injected into the metal melt, the gasified non-metal material will diffuse into the metal melt, and the metal and the non-metal material will exist in an atomic state, respectively, until it reaches the point where the atoms of the non-metallic element are saturated in the melt, and the melt remains stable.

In the production process of semiconductor materials, if pulling or vertical temperature gradient solidification is carried out at this point, semiconductor crystals, such as indium phosphide and gallium arsenide, will be generated.

The present invention applies another control process; reducing the ambient pressure of the metal melt.

With the reduction of the pressure (less than the saturated vapor pressure), the non-metal material in the melt will be volatilized rapidly, forming bubbles that spill out of the melt.

Metallic impurities in the non-metal material to be purified will remain in the metal melt.

Due to low content and slow volatilization rate, other volatile impurity elements in the non-metal material to be purified account for a small percentage in the volatilized bubbles, increasing the proportion of the element to be purified compared to the injected gasified substance, thus achieving the purification purpose.

After the gasified non-metal material is injected into the metal melt, according to the Langmuir equation, the purification capacity of the system in the phase of pressure reduction mainly depends on two factors:

1, the rate of pressure reduction of the system; and 2, the concentrations of the substance to be purified and impurities in the melt.

For example, if the substance to be purified is element phosphorus, and the symbol of the metal is m, the volatilization rate $J_p$ in the phosphorus bubbles in the phase of volatilization can be expressed as:

$$J_P = \alpha_{P4} \cdot \sqrt{\frac{M_{P4}}{2\pi RT}} \cdot P_{atm} \cdot \left( f_P \cdot \exp\left(-\frac{\Delta G_{m-P}}{RT}\right) \right)^4 \cdot x_0^4 \bigg) \cdot P_e \quad (1)$$

in which $P_e$ is the partial pressure of the phosphorus gas in the bubbles, the value of which is close to the ambient pressure $P_0$ when the concentration of the impurity elements is very low; $\alpha_{P4}$ is the kinetic coefficient of volatilization of element phosphorus; $P_{atm}$ is the standard atmospheric pressure; $f_p$ is the activity coefficient of phosphorus in the melt: $\Delta G_{m-p}$ is the Gibbs free difference of phosphorus dissolved in the metal m; $x_0$ is the concentration of phosphorus in the melt; $M_{P4}$ is the molar mass of the phosphorus gas ($P_4$); R is the Avogadro's constant; and T is the temperature of the melt.

It can be seen from the formula that the faster the ambient pressure $P_e$ decreases, the faster the volatilization rate $J_p$ of phosphorus is, the faster the growth rate of the phosphorus bubbles is, and the faster the spillage rate of the phosphorus bubbles is.

The gaseous molecular form of the impurity elements is $N_K$, and the volatilization rate $J_N$ of the impurity elements can be expressed as $$J_N = \alpha_{Nk} \cdot \sqrt{\frac{M_{Nk}}{2\pi RT}} \cdot P_{atm} \cdot \left( f_N \cdot \exp\left(-\frac{\Delta G_{m-N}}{RT}\right) \right)^k \cdot x_i^k \bigg) \cdot P_{Nk} \bigg) \quad (2)$$

in which $P_{NK}$ is the partial pressure of the impurity elements in the volatile bubbles, avx is the kinetic coefficient of volatilization of the impurity elements, $P_{atm}$ is the standard atmospheric pressure, K is the number of atoms in the gaseous molecule of the impurity elements, and $f_N$ is the activity coefficient of the impurity elements in the melt, $f_N$ being approximated to 1 in the case of a very low content of the impurities; $\Delta G_{m-N}$ is the Gibbs free difference of the impurity elements dissolved in the metal m, $x_i$ is the concentration of the impurity elements in the melt, and $M_{NK}$ is the molar mass of the foreign gas ($N_K$).

Design principle: the content of the impurity elements in element phosphorus is tested, $x_0$ of phosphorus injected into the melt is designed, then $x_i$ is calculated, and according to equations (1) and (2), the ambient pressure $P_0$ and the melt purification temperature T that satisfy $J_p>J_N$ and $J_P/J_N>1$ are obtained. $P_0$ is greater than or equal to the maximum saturated vapor pressure in the case that the concentration of phosphorus is $x_0$ at temperature T. The larger the difference of $J_p$-$J_N$ and the ratio of $J_P/J_N$ are, the better the purification effect is.

With the reduction of the ambient pressure, when the ambient pressure is lower than the saturated vapor pressure of the melt at the point that the composition is $x_0$, element phosphorus is precipitated from the melt to form bubbles, and with the reduction of the pressure, the pressure within the bubbles is reduced, the volume expands, and the value of $P_e$ decreases rapidly, resulting in that phosphorus further enters into the bubbles in the form of gas, and rapid reduction of the ambient pressure results in that phosphorus rapidly enters into the bubbles. The purification of element phosphorus is achieved as $J_P$ is greater than $J_N$.

Furthermore, even if the ratio $J_P/J_N$ of the volatilization rates of element phosphorus and impurities in the bubbles is constant in a certain phase, we can increase the rate $J_P$ under the dynamic ambient gas pressure by increasing the rate of reduction of the ambient pressure $P_e$, so as to achieve further purification thereof.

Other impurities, such as Fe, Ca, Co, Mg, Cr, Cd, Mn, Ni, Cu, Pb, Zn and Al, are dissolved in the melt.

Beneficial effects: the technical solution proposed by the present invention can be used to effectively remove the impurities in the non-metallic material, especially remove elements of similar properties: the apparatus is highly integrated and easy to control, and the method is simple; it is possible to adopt the apparatus and method proposed by the present invention to purify the non-metallic material many times to gradually improve the purity of the material; and using the metal material relevant in future to purify the non-metallic material, such as using indium to purify phosphorus for manufacture of indium phosphide in future, the side effects generated by the fact that the element to be purified includes metallic elements can be weakened.

In which: 1: furnace body: 2: pressure balance valve: 3: recoverer heater: 4: recoverer: 5: recovery chamber: 6: main heater: 7: crucible; 8: crucible support: 9: insulation sleeve: 10: source furnace lifting rod: 11: source furnace heating wire: 12: source furnace: 13: loader: 14: injection tube: 15: cooling tube: 16: boron oxide: 17: melt: 18: injected bubble: 19: support rod: 20: suspender: 21: substance to be purified; 22: recovery chamber open slot: 23: recovered volatile element: 24: volatile bubble: 25: weighing device.

DETAILED DESCRIPTION OF THE EMBODIMENTS

A gasified material to be purified is injected into a metal melt. Theoretically, the saturated vapor pressures of two elements must be different, and the element to be purified will be volatilized from the melt when the ambient pressure is reduced. Due to low content and slow volatilization rate of the impurities, the impurities will remain in the melt or only some of the element will be volatilized in the volatilization process of the element to be purified. By recovering the volatilized element, the purification of the material can be achieved. The present invention is an apparatus and method designed according to the above principle.

Apparatus Configuration.

Figure 1:
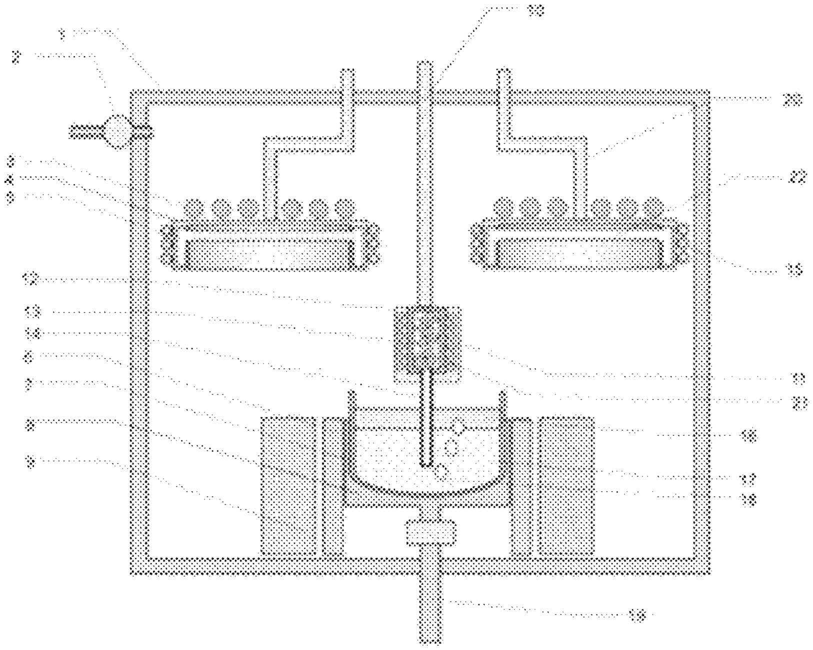
FIG. 1 is a schematic view of an operating state when a non-metallic material to be purified is injected into a melt.
Figure 2:
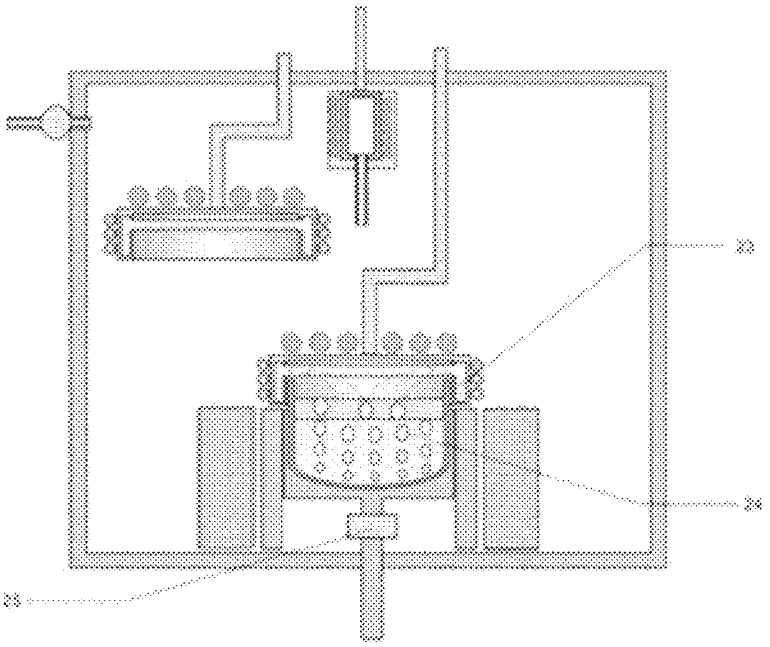
FIG. 2 is a schematic view of an operating state when the non-metallic material is recovered.

Refer to FIGS. 1 and 2, a purification apparatus of a non-metallic material includes a sealed furnace body 1, and a pressure balance valve 2 disposed on the side of the furnace body 1.

The sealing of the furnace body 1 can maintain environmental parameters in the purification process. The furnace body 1 can be disassembled for reuse after completion of the purification. The pressure balance valve 2 is the only channel between the furnace body 1 and the external environment and can be connected to a vacuum pump for injection of an inert gas.

The structure inside the furnace is functionally divided into 3 parts: a mechanism for generating a metal melt, a liftable injection mechanism for gasifying the material to be purified and injecting the material into the metal melt and a recovery mechanism for volatilized elements: the crucible 7 in the middle of the lower part of the furnace body 1, the heating and supporting structure for the crucible 7, the liftable injection mechanism disposed right above the crucible 7, and the recovery mechanism disposed next to the liftable injection mechanism.

The mechanism for generating the metal melt: the crucible 7 used for melting a metal to generate a metal melt. The heating and supporting structure for the crucible 7 includes a main heater 6 disposed on the outer side of the crucible 7, a crucible support 8 for supporting the crucible 7 and a support rod 19 connected to the crucible support 8, and an insulation sleeve 9 disposed surrounding the main heater 6. The support rod 19 extends to the outside of the furnace body 1 and can be connected to a driving device. A weighing device 25 is disposed between the crucible support 8 and the support rod 19.

The liftable injection mechanism: including a source furnace 12, and a source furnace lifting rod 10 connected to the source furnace 12: the source furnace 12 includes a loader 13, a source furnace heating wire 11 disposed surrounding the loader 13, and an injection tube 14 connected to the loader 13 from below; and the source furnace lifting bar 10 extends to the outside of the furnace body 1, and raises and lowers the source furnace 12 by means of a driving mechanism.

The recovery mechanism: including a recoverer 4, an annular recovery chamber 5 disposed within the recoverer 4, an open slot 22 formed in the upper part of the inner side of the annular recovery chamber 5, recoverer heaters 3, cooling tubes 15, and a suspender 20.

The recoverer heaters 3 are disposed on the recoverer 4, and the cooling tubes 15 are disposed at the periphery of the recoverer 4; the inner diameter of the annular recovery chamber 5 matches the outer diameter of the crucible 7 in size: the suspender 20 is connected to the recoverer 4 and extends to the outside of the furnace body 1: the suspender 20 is connected to a driving device to drive the recovery mechanism to move up and down in a straight line, and rotate on the axis of the suspender 20, and one of the positions arrived through rotation is that the recovery mechanism is located right above the crucible 7.

In order to recover as much as possible of the element to be purified in a single purification process, two sets of recovery mechanisms are provided for recovery under different process conditions.

Method Implementation.

The purification method is accomplished by the apparatus described above, the non-metallic material is a volatile material for manufacturing a semiconductor crystal, and the metal is a low-melting point metal in group III with a purity higher than 99.9%.

The purification method includes the following steps: injecting the gasified non-metallic material into the metal melt under a high-pressure environment; reducing the ambient pressure, and collecting bubbles volatilized from the metal melt to obtain the purified non-metallic material.

The present invention is focused on manufacturing a semiconductor crystal, therefore, the non-metallic material in the example is a volatile material for manufacturing a semiconductor crystal, such as phosphorus, sulfur, arsenic and other elements: the metal is a low-melting point metal in group III, such as indium and gallium; and the substance synthesized from the non-metallic material and the metal is a semiconductor material, such as indium phosphide and gallium arsenide, so that it is preferred to use indium to purify phosphorus, use gallium to purify arsenic, etc.

Since the saturated vapor pressures of two elements in the same metal melt must be different, a non-metallic material of arbitrary purity can be purified using the method proposed in the present invention. As crude purification can use more economical and efficient process methods, the purity of the non-metallic material before purification in the example is greater than 95%.

The purity of the non-metallic material before purification is tested, the amount of impurity elements in the material are calculated, in order to obtain the ambient pressure, the melt composition, and the melt purification temperature required to satisfy that the volatilization rate of the element to be purified is greater than that of the impurities in the metal melt.

In this example, indium (In) metal is used to purify phosphorus (P).

In particular, during operation, the substance to be purified 21 (phosphorus) is put into the loader 13, and the loader 13 is sealed, leaving only one end of the injection tube 14 in communication with the outside world. The loader 13 is placed in the source furnace 12, and the source furnace 12 is placed in the furnace body 1.

Step A, a pure metal (indium with a purity greater than 99.9%) and boron oxide 16 are put into the crucible 7, and the furnace body is vacuumed to 1 to $10^{-5}$ pa through the pressure balance valve 2.

Step B, the furnace body 1 is filled with an inert gas, so that the pressure of the furnace body 1 is higher than the design pressure.

Step C, the metal is heated to the design temperature by means of the main heater 6 to melt the metal to form the metal melt 17.

As for design temperature and design pressure.

The design temperature is T+m. T is the melting point of indium phosphide, a binary compound of In and the non-metallic material to be purified P.

m has a value range of 10 to 200K.

The purpose of heating up to the design temperature is to keep the metal melt in a molten state, so that no indium phosphide crystal is generated due to temperature reduction.

Due to the presence of pressure, the melting point of indium phosphide in the furnace body 1 is higher than its melting point at atmospheric pressure, so that the design temperature is T+m.

The melting point of indium phosphide at atmospheric pressure is T=1062° C. and the melting point of metal indium at atmospheric pressure is 156.61° C. When being heated to the design temperature, the metal indium has been melted.

The design pressure is the saturated vapor pressure at which the metal and the non metal form an 1% melt system (1% non-metallic element contained in the metal melt) at the design temperature.

Saturated vapor pressures under different conditions are shown in table below.

| Melt system | Temperature (K) | Saturated vapor (MPa) |
|---|---|---|
| In-50 at. % P | 1345 | 2.86 |
| In-50 at. % P | 1355 | 2.89 |
| In-50 at. % P | 1405 | 3.15 |
| In-50 at. % P | 1500 | 3.71 |
| In-60 at. % P | 1345 | 5.86 |
| In-60 at. % P | 1355 | 5.97 |
| In-60 at. % P | 1405 | 6.57 |
| In-60 at. % P | 1500 | 7.78 |
| In-30 at. % P | 1345 | 0.51 |
| In-30 at. % P | 1355 | 0.52 |
| In-30 at. % P | 1405 | 0.53 |
| In-30 at. % P | 1500 | 0.62 |
| In-35 at. % P | 1345 | 0.82 |
| In-35 at. % P | 1355 | 0.83 |
| In-35 at. % P | 1405 | 0.88 |
| In-35 at. % P | 1500 | 1.03 |

In the table, In-50 at. % P represents that In and P form a 50% melt system, i.e., the melt contains phosphorus atoms with an atomic percentage of 50%.

In the above table, the design temperature and the design pressure are a set of data corresponding to "temperature (K)" and "saturated vapor pressure (MPa)". If data in line 5 are selected, In-60 at. % P 1345 5.86

I=60, the design temperature in step C is 1345K, and the design pressure in step B is higher than 5.86 MPa. Under the design temperature and the design pressure, the In-60 at. % P melt maintains stable, i.e., an In—P metal melt is formed.

Step D, the source furnace 12 is lowered and rotated through the source furnace lifting rod 10 such that the injection tube 14 is inserted into the melt 17 through a boron oxide layer.

Step E, the non-metallic material substance to be purified 21 is heated through the source furnace heating wire 11 until it is gasified; and the gasified non-metallic material is injected into the metal melt 17 to form injected bubbles 18, until the substance to be purified in the source furnace 12 is completely gasified.

Prior to this step, the recovery mechanism is raised to the top of the furnace body 1, so as to be away from the crucible 7, reducing the possibility of contaminating the recovery mechanisms.

After the injected bubbles 18 enter into the melt 17, the bubbles break, at which point the element to be purified and the metal melt are combined into a whole, and no chemical reaction occurs between the element to be purified and the metal due to temperature and pressure. At the same time, because the pressure inside the furnace body 1 is higher than the saturated vapor pressure at which the metal and the element to be purified form the melt with the maximum composition at the purification temperature, at which point the substance to be purified 21 cannot be volatilized from the melt 17.

The injected amount of phosphorus is calculated according to the design requirements and selected parameters, and the affecting parameters are the melt system and the total amount of metal indium.

If the melt system is In-60 at. % P, and the amount of metal indium in the furnace body 1 is known, based on the above conditions, the maximum amount M of phosphorus that can be injected into the melt to keep the metal melt stable at the design temperature and pressure can be calculated. In actual operation, the injected amount should be less than M; and otherwise, some of the phosphorus will be volatilized from the melt, resulting in an uncontrollable process.

Step F, the source furnace 12 is raised to be away from the crucible 7; and heating the metal is stopped.

At this point, the metal melt is in a steady state, which includes the phosphorus to be purified and impurities.

The states of other non-metallic volatile impurities in the melt:

As (arsenic): at the temperature of 1345K, the saturated vapor pressure of As in the In-60 at % As melt is about 0.1-0.3 MPa, while the saturated vapor pressure of In-60 at % P is 5.86 MPa at this point. Since the purity of the phosphorus to be purified is greater than 95% and the maximum content of As in the In-60 at % P system is only about 3 at. %, the saturated vapor pressure of As will be much less than 0.1-0.3 MPa, about 0.005-0.015 MPa, and therefore As will not be precipitated directly from the In melt when the ambient pressures is the design pressure (greater than or equal to 5.86 MPa).

S (sulfur): for the same reason, the saturated vapor pressure of S in the In-60 at % S melt is less than 0.5 MPa at the temperature of 1345K. Since the purity of the phosphorus to be purified is greater than 95% and the maximum content of S in the In-60 at % P system is only about 3 at. %, the saturated vapor pressure of S will be much less than 0.5 MPa, less than 0.025 MPa, and therefore S will not be precipitated directly from the In melt when the ambient pressure is the design pressure (greater than or equal to 5.86 MPa).

One of the recoverers 4 is heated to 50-100K above the sublimation point of element P by means of the recoverer heaters 3, preventing deposition of the volatile element P onto the recoverer 4 during the injection process.

Step G, one of the recoverers 4 is rotated to be above the crucible 7 by means of the suspender 20 and lowered, and the lowering of the recoverer 4 can cover the crucible 7 as the inner diameter of the annular recovery chamber 5 matches the outer diameter of the crucible 7 in size. The temperature of the recoverer 4 is cooled down to below the sublimation point of the non-metallic material to be purified by means of the cooling tubes 15. Refer to FIG. 2 for the state of the apparatus at this point.

While maintaining the temperature of the furnace body 1, the pressure of the furnace body 1 is gradually reduced by means of the pressure balance valve 2, at a rate of pressure reduction of 0.1-1000 Pa/s, to a saturated vapor pressure value that the concentration of phosphorus in the melt is Q %. In this example, Q=30, and the pressure is reduced to the saturated vapor pressure of 0.51 MPa of the In=30 at. % P.

In the pressure reduction process, some of the element phosphorus is volatilized from the melt as the pressure is less than the saturated vapor pressure of 5.86 MPa of the In-60 at. % P.

Other non-metallic volatile impurities, due to temperature, pressure, and the content of the impurities in the melt, will remain in the melt and will not be volatilized or will be volatilized in very small amounts.

In the purification process, the ambient pressure is reduced, and the ambient pressure is reduced to 0.51 MPa in this example. This pressure is still much greater than the saturated vapor pressure of As (about 0.005-0.015 MPa) and much greater than the saturated vapor pressure of S (less than 0.025 MPa), and thus As and S will not be volatilized from the melt during the purification process.

Since the volatilization rate of phosphorus is greater than that of the impurities, the main element in the volatilized bubbles is phosphorus, and the vast majority of the impurity elements remain in the melt, which can realize the purification of phosphorus.

Metallic impurities and non-volatile impurities remain in the metal melt 17.

It is apparent that Q is smaller than I.

Step H, the volatile bubbles 24 enter the annular recovery chamber 5 via the open slot 22 at the upper part of the inner side of the annular recovery chamber 5; and due to the continuous cooling effect of the cooling tubes 15, the volatile bubbles 24 break after floating up from the boron oxide 16, and the volatile substance to be purified condenses in the annular recovery chamber 5 to obtain the recovered volatile element 23. The disappearance of the bubbles indicates that at this temperature and pressure, there has been no more volatilizable substance to be purified.

Tests show that the phosphorus obtained by the above steps has a significantly improved purity compared to that before purification.

Since the purified phosphorus will be used in the later period to produce indium phosphide, the undesirable effects that indium is doped in phosphorus can also be reduced.

At this point, the annular recovery chamber 5 of the recoverer 4 contains the primary purified element therein. The primary purified element has the highest purity.

After disappearance of the volatile bubbles 24, the recoverer 4 is lifted up to be away from the crucible 7.

In this example, after the above steps, due to the ambient pressure, the metal melt still contains part of the element phosphorus (In-30 at. % P) that has not been volatilized, which can further reduce the pressure in the furnace body 1 so that more phosphorus is volatilized for secondary recycling, but the purity of the phosphorus obtained from the recovery will be reduced. As described in the following steps:

One of the recoverers 4 is heated to 50-100K above the sublimation point of element P by means of the recoverer heaters 3.

Step I, the recovery mechanism is raised to the top of the furnace body 1.

Step J, another recoverer 4 is rotated to be above the crucible 7 by means of a suspender 20 and lowered, and the lowering of the recoverer 4 can cover the crucible 7 as the inner diameter of the annular recovery chamber 5 matches the outer diameter of the crucible 7 in size. The temperature of the recoverer 4 is cooled down to below the sublimation point of the non-metallic material to be purified by means of the cooling tubes 15.

The pressure of the furnace body 1 is gradually reduced by means of the pressure balance valve 2, at a rate of pressure reduction of 0.1-1000 Pa/s, to a saturated vapor pressure value that the concentration of phosphorus in the melt is R %, and R<Q. In this example, the value of R is 20, and the pressure can be calculated.

Step K, the volatile bubbles 24 are collected with the recoverer 4 until no more volatile bubbles are generated.

At this point, the annular recovery chamber 5 of this recoverer 4 contains the secondary purified element therein.

The furnace body 1 is cooled down and the purified element in the two recoverers 4 is removed.

The purity of the secondary purified element is lower than that of the primary purified element.

It is possible to continue reducing the pressure in the furnace body 1 to volatilize all the elements for recovery, but the purity will be reduced.

The purified elements can be further purified through acid pickling to remove metal elements contained in the melt.

The recoverer 4 is made of quartz, which is cleaned after use each time and soaked in 5%-30% of hydrofluoric acid for 2-5 hours before being dried for reuse.

The inner diameter of the annular recovery chamber 5 matches the outer diameter of the crucible 7 in size. In this example, the inner diameter of the annular recovery chamber 5 is 1-15% larger than the outer diameter of the crucible 7.

A weighing device 25 is used for estimating the weight of the substance injected into and volatilized from the crucible 7.

Using the method proposed in the present invention, the purified phosphorus is used as a raw material for further purification, and ultimately, a semiconductor raw material with a purity of 99.999% or more can be obtained.

The above example uses indium (a low-melting point metal in group III) to purify phosphorus (a volatile material), and the example is only intended to aid in the understanding of the inventive principles and contents, and is not intended to serve as a limitation.

The table below gives the saturated vapor pressures at different temperatures in different melt systems, whereby the purification of non-metallic volatile materials can be achieved using other melt systems.

| Melt system | Temperature (K) | Saturated vapor pressure (MPa) |
|---|---|---|
| In-50 at. % As | 1226 | 0.034 |
| In-50 at. % As | 1256 | 0.04 |
| In-50 at. % As | 1316 | 0.07 |
| Ga-50 at. % As | 1521 | 0.25 |
| Ga-50 at. % As | 1551 | 0.35 |
| Ga-50 at. % As | 1611 | 0.5 |

For different impurities, the present invention can adjust the saturated vapor pressures of the element to be purified and impurities and the volatilization rates of the element to be purified and impurity elements by adjusting the concentration of the element to be purified injected into the metal melt, the ambient pressure, the melt temperature, and the rate of reduction of the ambient pressure, so as to achieve the purification of the impurity elements. The element can be purified gradually through multiple times of purification.

With the present invention, phosphorus is purified by 3-5 cycles, i.e., the purified material is used as the raw material for next purification, and for each purification, different purification temperatures, different ambient pressures, different rates of reduction of ambient pressure, and other conditions can be set according to the purity of the raw material, and the purity is higher than 99.999% after acid pickling, satisfying the requirements for use.

Impurity contents:

As<0.1 ppm; S<0.1 ppm; Cu<0.05 ppm; Sb<0.1 ppm; Al<0.1 ppm; Cu<0.15 ppm; Cr<0.05 ppm; and Fe<0.15 ppm.

The purity of phosphorus can be further improved by increasing the number of cycles of purification.

The indium phosphide prepared from red phosphorus purified using this method has a mobility ratio of 3500-4900 ($cm^2/V \cdot s$), and a carrier concentration of $>1\times10^{15}$ ($cm^{-3}$).

It should be noted that any technical solutions obtained according to the principles of the present invention and the hints of the embodiments are encompassed within the protection scope of the present invention.

What is claimed is:

1. A purification apparatus of a non-metallic semiconductor material, comprising a sealed furnace body, and a pressure balance valve disposed on a side of the furnace body, wherein the purification apparatus further comprises a crucible disposed in a middle of a lower part of the furnace body, a heating and supporting structure for the crucible, a liftable injection mechanism disposed right above the crucible, and a liftable and rotatable recovery mechanism disposed next to the liftable injection mechanism;

the liftable injection mechanism comprises a source furnace, and a source furnace lifting rod connected to the source furnace; the source furnace comprises a loader, a source furnace heating wire disposed surrounding the loader, and an injection tube connected to the loader from below; the source furnace lifting rod extends to the outside of the furnace body, and raises and lowers the source furnace by means of a driving mechanism.

2. The purification apparatus according to claim 1, wherein the recovery mechanism comprises a recoverer, an annular recovery chamber disposed within the recoverer, an open slot disposed in the upper part of the inner side of the annular recovery chamber, recoverer heaters, cooling tubes, and a suspender;

the recoverer heaters are disposed on the recoverer, and the cooling tubes are disposed at the periphery of the recoverer; an inner diameter of the annular recovery chamber matches an outer diameter of the crucible in size; the suspender is connected to the recoverer and extends to the outside of the furnace body; and two sets of recovery mechanisms are provided.

3. The purification apparatus according to claim 1, wherein the heating and supporting structure for the crucible comprises a main heater disposed on the outer side of the crucible, a crucible support for supporting the crucible and a support rod connected to the crucible support, and an insulation sleeve disposed surrounding the main heater; the support rod extends to the outside of the furnace body; and a weighing device is disposed between the crucible support and the support rod.

4. A purification method of a non-metallic semiconductor material, completed based on the purification apparatus of claim 1, wherein the purification method comprises the following steps: injecting the gasified non-metallic material into the metal melt under a high pressure environment; reducing the ambient pressure, and collecting the non-metallic material in the bubbles spilling out of the metal melt, thereby obtaining the purified non-metallic material.

5. The purification method according to claim 4, comprising the following steps:

step A, putting a metal in a crucible in the furnace body, and placing a non-metallic material substance to be purified in a loader; vacuuming the furnace body to $10^{-5}$ pa;

step B, filling the furnace body with an inert gas, so that the pressure of the furnace body is higher than a design pressure;

step C, heating the metal to a design temperature, and melting the metal to form a metal melt;

step D, lowering the source furnace and inserting an injection tube into the metal melt;

step E, raising the recovery mechanism to the top of the furnace body; heating the non-metallic material substance to be purified after it is gasified; injecting the gasified non-metallic material into the metal melt until the non-metallic material substance to be purified in the loader is completely gasified;

step F, raising the source furnace; and stopping heating the metal;

step G, placing the recovery mechanism above the crucible and reducing the pressure of the furnace body; and step H, collecting volatilized bubbles while continuously cooling the recoverer until the bubbles disappear.

6. The purification method according to claim 4 or 5, wherein the non-metallic material is a volatile material for manufacturing a semiconductor crystal, and the metal is a low-melting point metal in group III with a purity higher than 99.9%; and the substance synthesized by the non-metallic material and the metal is a semiconductor material.

7. The purification method according to claim 6, wherein the design temperature is T+m, T is the melting point of the binary compound formed by the metal and the non-metal material to be purified, and m has a value range of 10 to 200K;

the design pressure is the saturated vapor pressure at which the metal and the non-metal material to be purified form an 1% melt system at the design temperature;

in step G, the pressure of the furnace body is reduced to the saturated vapor pressure at which the metal and the non metal to be purified form an Q % melt system; and Q<I.

8. The purification method according to claim 7, wherein before step G, the recoverer is heated to 50-100K above the sublimation point of the non-metal material to be purified; and step G, placing the recovery mechanism above the crucible and cooling the recoverer to a temperature below the sublimation point of the non-metal material to be purified; and reducing the pressure of the furnace body.

9. The purification method according to claim 8, wherein the method further comprises:

step I, raising the recovery mechanism to the top of the furnace body;

step J, placing the second set of recovery mechanism above the crucible and reducing the pressure of the furnace body; and step K, collecting volatilized bubbles until the bubbles disappear.

10. The purification method according to claim 9, wherein in step J, the pressure of the furnace body is reduced to the saturated vapor pressure at which the metal and the non metal form an R % melt system; and R<Q.

* * * * *